United States Patent [19]

Pall

[11] Patent Number: 4,966,700
[45] Date of Patent: Oct. 30, 1990

[54] APPARATUS FOR SEPARATING INTO ITS TWO PHASES A SUBSTANCE CONSISTING OF SOLID MATTER SUSPENDED IN A LIQUID

[76] Inventor: Ernö Pall, 3 Lotissement Le Colombé, Frontigny - 57420 Verny, France

[21] Appl. No.: 367,039

[22] Filed: Jun. 16, 1989

[51] Int. Cl.⁵ .............................................. B01D 35/00
[52] U.S. Cl. ..................................... 210/386; 210/396
[58] Field of Search ............... 210/386, 391, 396, 350; 209/307; 162/348, 351; 100/112, 120

[56] References Cited

U.S. PATENT DOCUMENTS

| 3,540,586 | 11/1970 | Bailey et al. | |
|---|---|---|---|
| 4,088,581 | 5/1978 | Carle | 210/391 |
| 4,182,680 | 1/1980 | Carle | 210/386 |

FOREIGN PATENT DOCUMENTS

| 2251265 | 5/1974 | Fed. Rep. of Germany . |
| 3411087 | 9/1985 | Fed. Rep. of Germany . |
| 1107651 | 1/1956 | France . |
| 1391871 | 2/1965 | France . |
| 1194676 | 6/1970 | United Kingdom . |

Primary Examiner—Frank Sever
Attorney, Agent, or Firm—Mason, Fenwick & Lawrence

[57] ABSTRACT

The apparatus comprises, among other things, an external group or unit (10) and an internal group or unit (20) which are movable relatively and which define a chamber (17) and an enclosure (223) separated by a body (11) permeable with respect to the liquid and impermeable with respect to the solid matter and an impervious elastic membrane (220) which can be expanded so as to be able to reduce the volume of the enclosure (223) in order to expel from it the liquid of the substance to be treated which has been placed therein and in order to press the solid matter against the body (11) or a filter (16) from where the said solid matter is detached by a scraper (50) so as to be collected separately.

Application for the production of separated solid matter with a dry-matter content at leaet equal to 40%.

29 Claims, 8 Drawing Sheets

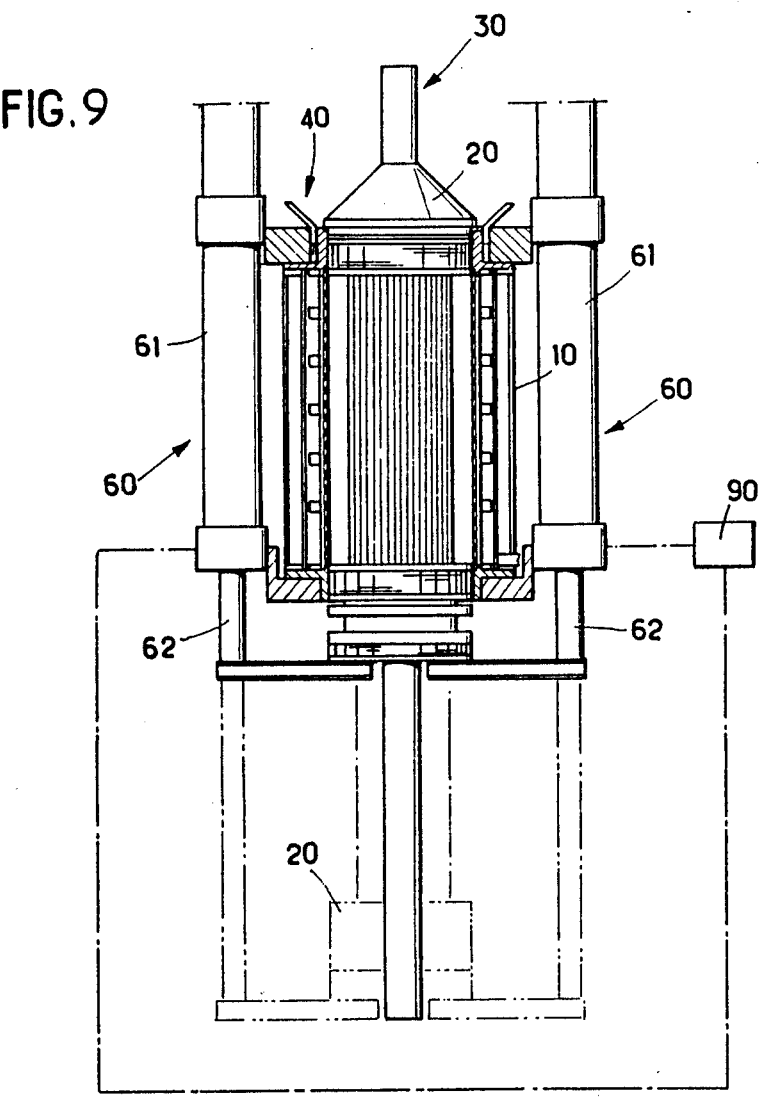

APPARATUS FOR SEPARATING INTO ITS TWO PHASES A SUBSTANCE CONSISTING OF SOLID MATTER SUSPENDED IN A LIQUID

The present invention relates to the treatment of substances and, more particularly, to the treatment of substances consisting of solid matter suspended in a liquid.

The invention relates more especially to the separation, into its two phases, of a substance consisting of solid matter suspended in a liquid.

In numerous industries, use is made of substances where solid matter is suspended in a liquid and must be separated therefrom such that solids and liquid can be collected separately.

This type of problem is encountered, for example in food industries such as the dairy, brewing and wine industries. This problem is also encountered to a greater extent downstream in industrial production processes when the waste water and effluents, for example of urban sewage purification plants, must be treated.

The same applies for example to river or port activities when it is required to treat the sludge which has a tendency to silt up navigation channels.

In the current known art, use is made, for example, of band filters, press filters, centrifuging machines or lyophilization plants.

Other solutions have already been proposed, such as those which are described in British Patent No. 1,194,676.

This document describes an apparatus which comprises essentially an external group or unit and an internal group or unit which are movable relative to each other and which define a chamber and an enclosure separated by a body which is permeable with respect to liquid and impermeable with respect to solid matter. An impervious elastic membrane, which can be expanded, is arranged so as to enable reduction of the volume of the enclosure in order to expel the liquid of the substance to be treated which has been placed inside the chamber and in order to press the solid matte against the body from where it is detached by a scraper so as to be collected separately.

Whatever the method used, the dry-matter content of the mass obtained varies from 20 to 25% at the most. In certain cases, the dry-matter content may be improved by adding a chemical additive, for example lime or a calcium hydrate, to the substance to be treated: in this case a content of about 35% is achieved.

For numerous applications where the solid matter recovered is then upgraded through use, this factor is relatively unsatisfactory even when use is made of chemical additives ensuring flocculation. In this latter case, the flocculating agent which is very often an organic molecule for example a polymer or a formaldehyde solution, is rapidly destroyed either by the temperature or by the mechanical forces if the solid mass is subjected to a compressive force in order to expel more liquid therefrom.

It will be understood, therefore, that the problem of treating substances consisting of solid matter suspended in a liquid in order to separate the two phases thereof and recover them separately in the solid compacted state with a high dry-matter content and in the liquid state practically free from any solid matter, is of great interest in industry and poses major practical problems, in particular when continuous operation is required.

The object of the present invention is to overcome these drawbacks by the almost continuous treatment of substances so as to obtain a dry-matter content which approaches or even exceeds 50% by weight for the solid matter collected, even when there is no chemical additive.

The invention relates to an apparatus for separating into its two phases a substance consisting of solid matter suspended in a liquid and for recovering them separately in the compacted solid state with a high dry-matter content and in the liquid state practically free from solid matter, which comprises, among other things, an external group or unit and an internal group or unit, with symmetry of revolution, which are movable relative to each other and which define a chamber and an enclosure separated by a body permeable with respect to the liquid and impermeable with respect to the solid matter, and which comprises an impervious elastic membrane, which can be expanded, arranged so as to enable reduction of the volume of the enclosure in order to expel the liquid of the substance to be treated which has been placed inside the chamber and in order to press the solid matter against the body, and which comprises a scraper for detaching, if necessary, the solid matter pressed against the body so that it can be collected separately.

The apparatus according to the invention is characterized in that it comprises a central guide for directing the relative displacements of the external and internal groups and a hopper for supplying substance to be treated, which is mounted on top of the external group to which it is fixed and which is closed at its bottom by a closing device centred on the guide.

Other characteristic features of the invention will emerge upon reading the description and claims which follow and by examining the accompanying drawing, provided solely by way of example, in which:

FIG. 9 is an illustration of an embodiment of a device for actuating the apparatus according to the invention so as to cause relative displacements of the internal and external groups.

Since the apparatus according to the invention uses components well known in the particular art in question and assembly methods which are conventional in mechanical engineering, only that which is of direct relevance to the invention will be described. Moreover, the specialist in this area will draw upon current solutions available in order to deal with the particular problems which must be solved.

In the continuation of the description the same reference number will be used to identify an element whatever the variation of embodiment in which it is used.

Figure 1:
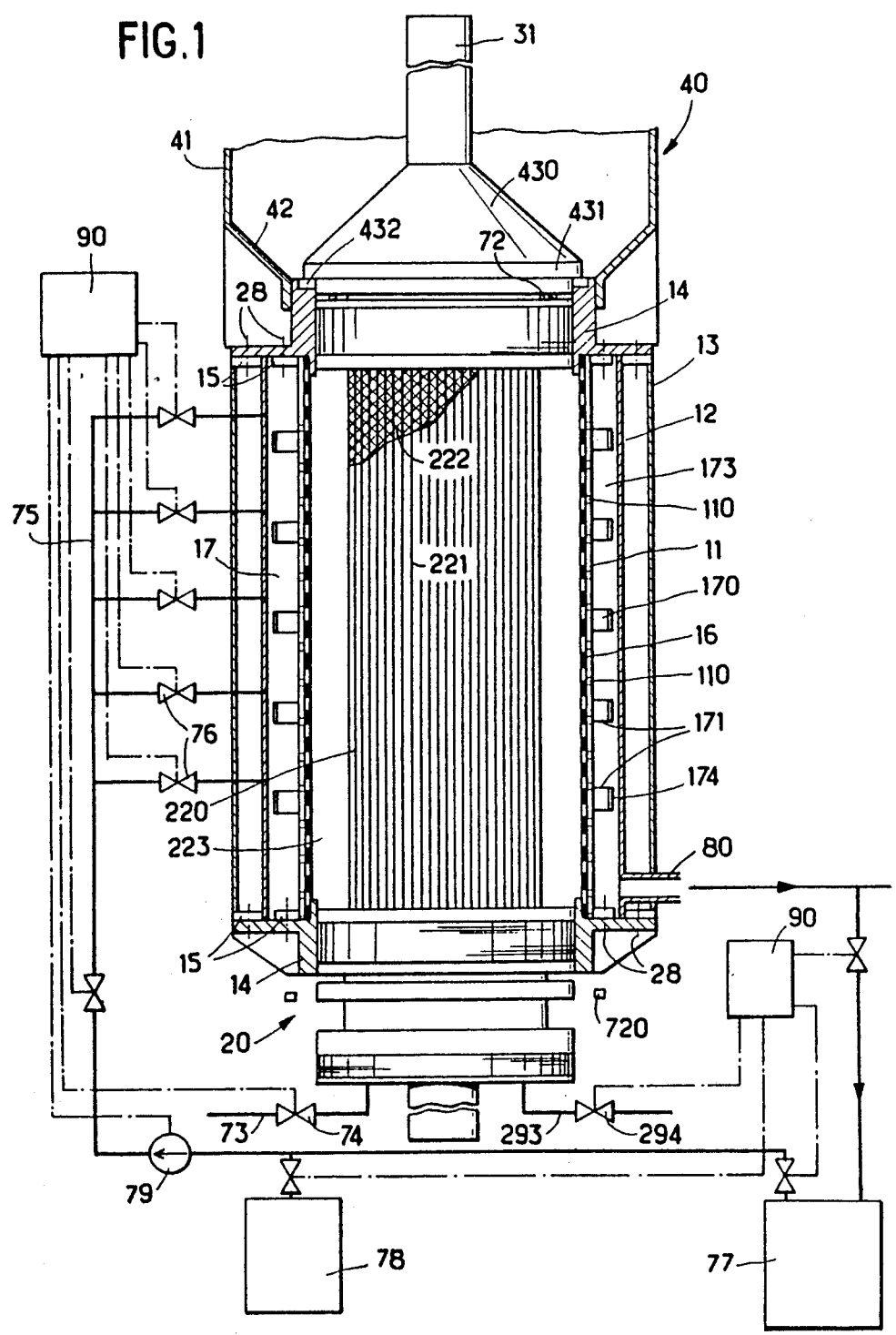
FIG. 1 is a view, partially in meridian section, of an embodiment of an apparatus according to the invention.
Figure 2:
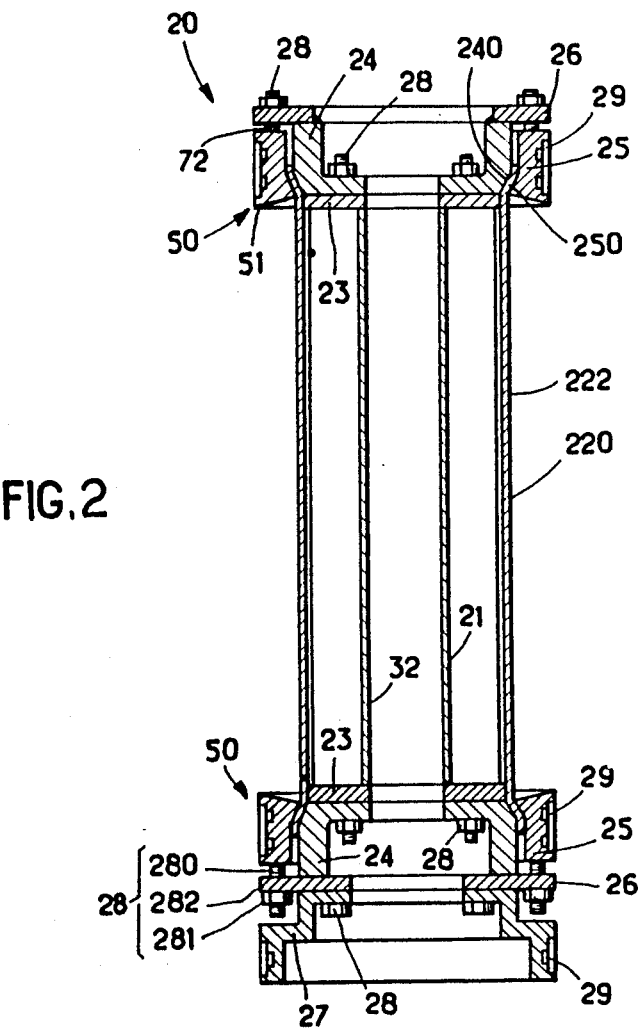
FIG. 2 is a view, in meridian section, of the internal group of the apparatus according to the invention and illustrated in FIG. 1.

As can be seen, in particular in FIGS. 1 and 2, an apparatus according to the invention for separating into its two phases a substance consisting of solid matter suspended in a liquid and for recovering them separately in a solid state with a high dry-matter content and a liquid state practically free from solid matter, comprises, among other things, an external group or unit 10 and an internal group or unit 20. This apparatus comprises also a guide 30, a hopper 40, a scraper 50, an actuating device 60, a cleaning arrangement 70, discharge ducts 80 and means for controlling and supplying fluids 90. Reference will be made again subsequently to each of these subassemblies which form the apparatus according to the invention.

As can be seen, in particular in FIG. 1, the external group 10 comprises a body 11 made for example from thick sheet metal with holes 110 formed in it. A collar 14 is fixed at each of the ends of the body 11, for example by means of welding. These collars hold between them a casing 12 and a cover 13 by means of reinforcements 15 which are for example bolted or screwed, as illustrated schematically. The collars have an annular shape and square cross-section and the reinforcements are in the form of annuli, as can be seen clearly from the drawings.

All these elements, which are preferably made of metal and chosen from grades which are resistant to the environments in which they are located, are assembled using conventional modern-day methods.

As can be seen in particular in FIG. 2, the internal group 20 comprises a tube 21 at each of the ends of which there are fixed circular rims 23. Between these circular rims there is located a skirting 22 coaxial with the tube 21.

Each of the circular rims has a flange 24 with which a counter-flange 25 is associated. Each of these flanges 24 has, towards the outside, a collar plate 26.

As can be seen, the bottom collar plate 26 also has a sleeve 27.

All these elements, which are preferably made of metal, are assembled using conventional welding methods or with the aid of fixing members 28 which make use, for example, of studs or bolts 280 which cooperate with nuts 281 and which pass through suitable holes 282; only some of them are illustrated, the others being merely suggested. Such an assembly method is conventional in mechanical engineering and will not be dwelt upon further.

As can be seen, the upper and lower flanges 24 and counter-flanges 25 are identical and each have conical complementary flanks 240 and 250, respectively. Between these flanks there is located an elastic membrane 220. It will be understood that by adjusting the clamping force of the fixing nuts, it is possible to move closer together the complementary conical flanks located opposite each other and thus both fix and tension the elastic membrane 220.

As can be seen in FIG. 1 for example, the elastic membrane 220 has external channels 221 and is covered on its external surface with an elastic mesh 222 for reasons which will be explained below. These membranes and meshes are made, for example, from suitable commercial synthetic materials.

Figure 5A:
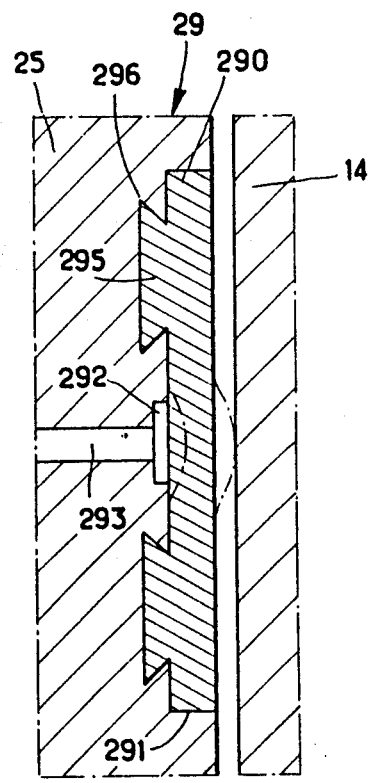
FIGS. 5A and 5B are detailed partial sections through embodiments of the seals which ensure a sealing action between the external and internal groups of the apparatus according to the invention.
Figure 5B:
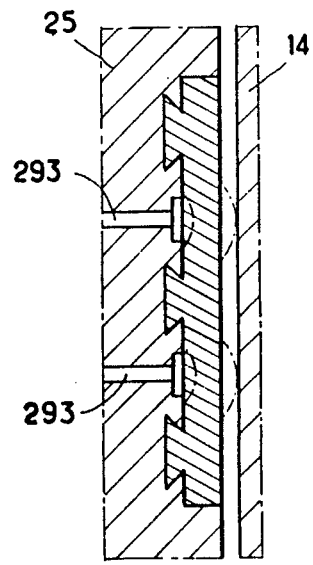

As can be seen by referring to FIG. 2 and the detailed FIGS. 5A and 5B, seals 29 are located on the periphery of the counter-flanges 25 and the sleeve 27. These seals 29, which for example are expandable, preferably consist of an elastic annulus 290 accommodated in a hollowed cavity 291 of a groove 292. As illustrated, these seals preferably have at least one protrusion 295, for example in the form of a dovetail, which is engaged in a recess 296 of complementary shape. Where required, the protrusion is also glued or otherwise fixed in any suitable appropriate manner to the corresponding recess in order to complete the joint and, if necessary, ensure fluid-tightness for the reason which will be understood below. Into each groove 292 there leads at least one pipe arrangement 293 provided with suitable solenoid valve(s) 294. The solenoid valves are governed by the control means 90.

As a result of this pipe arrangement, it is possible to inject or discharge a pressurized fluid, for example compressed air, in order to dilate outwards the annuli, as shown in broken lines, for the reasons which will be explained below.

As can be seen in FIG. 2, a scraper 50 is provided on the internal group 20.

This scraper consists of an edge 51 of the counter-flange 25 which is inclined in the form of an undercut, as illustrated, for example with an angle of about 15°.

As can be seen, the apparatus according to the invention also comprises a guide 30.

This guide consists of a column 31 and the internal wall 32 of the tube 21 which is able to slide against the external wall of the column.

The internal and external groups possess symmetry of revolution, for example cylindrical in general, and are engaged one inside the other so as to be coaxial. This can be seen clearly from examining FIGS. 1 to 4 in particular; tube 21 and column 31 are arranged as illustrated such that the internal group and external group are able to move relative to each other, in translation, along their axis of symmetry.

As can be seen clearly in FIG. 1, the apparatus according to the invention also comprises a hopper 40.

This hopper consists, essentially, of a vessel 41 which has a funnel-shaped bottom 42 in the centre of which a closing device 43 is located. This closing device comprises a valve 430, which is for example bell-shaped, provided with a shoulder 431 intended to cooperate with a seat 432, for example formed in the top of one of the collars 14 or mounted on the latter. Where required, a seal is interposed.

As will be seen, the valve is mounted movably on the column which passes through it and is able to move by sliding on the latter so as to be able to cover or uncover an annular orifice 433 which the shoulder 431 and the seat 432 define. A suitable seal, not shown, ensures a sealing action between column 31 and valve 430 without impeding their relative movements. The movements of the valve 430 are controlled by those of the internal group 20 so as to allow filling of the enclosure 223 with substance to be treated.

An actuating device 60 is inserted between the external group 10 and the internal group 20 so as to move them relative to each other.

Figure 10:
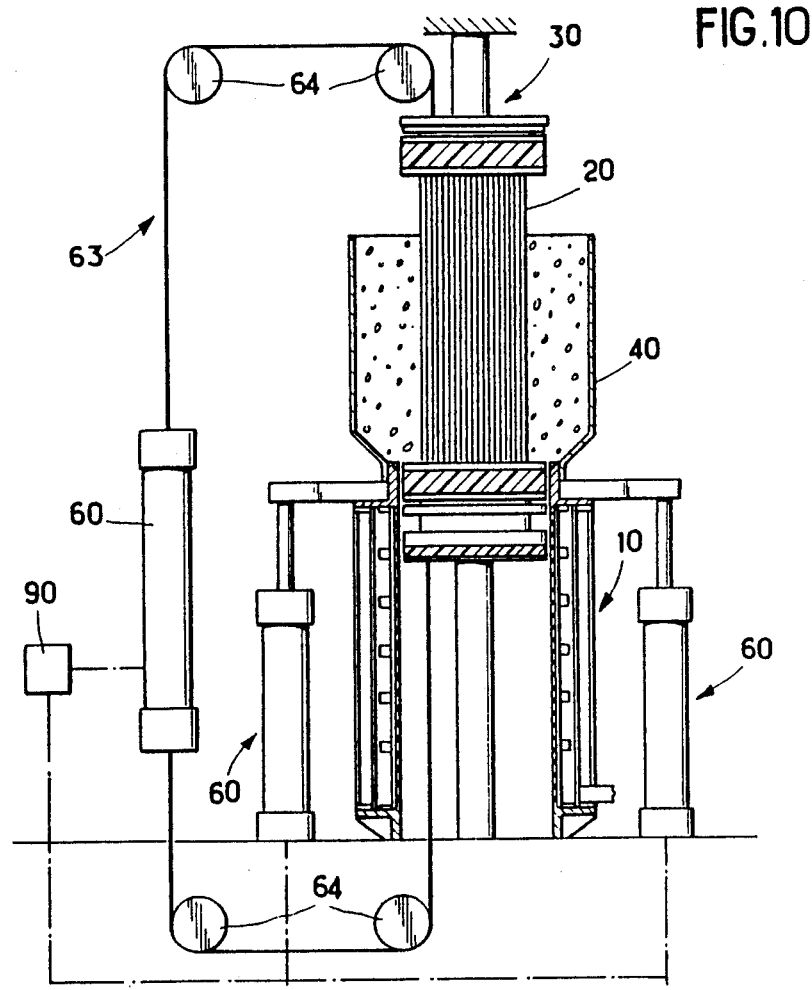
FIG. 10 is a view of another variation of embodiment of the device for actuating the apparatus according to the invention.

Preferably, this device consists of a pneumatic or hydraulic jack for example, with a plunger 61 and a cylinder 62 which are connected to the external group 10 and to the internal group 20, respectively, as can be seen more clearly by examining FIGS. 9 and 10. The manner in which the join between jack and group is effected is conventional.

This actuating device 60 is governed by the control means 90.

As can be seen by examining FIG. 1 in particular, the chamber 17 is divided into compartments 173 above which dividers 170 are located. These dividers consist, for example, of separate partitions 171 kept at a distance from each other by struts 172. These dividers made of suitable material are fixed onto the body 11 for example by means of welding. On the struts there are arranged, where required, seals 174, not shown in detail so as not to overload the drawing, for example of the same type as those described above, so as to be able to isolate, if necessary, the compartments from each other for the reasons which will be understood below. In this case, the seals cooperate with the casing 12 which is located opposite them. If necessary, these seals are also governed by the control means 90.

Figure 8A:
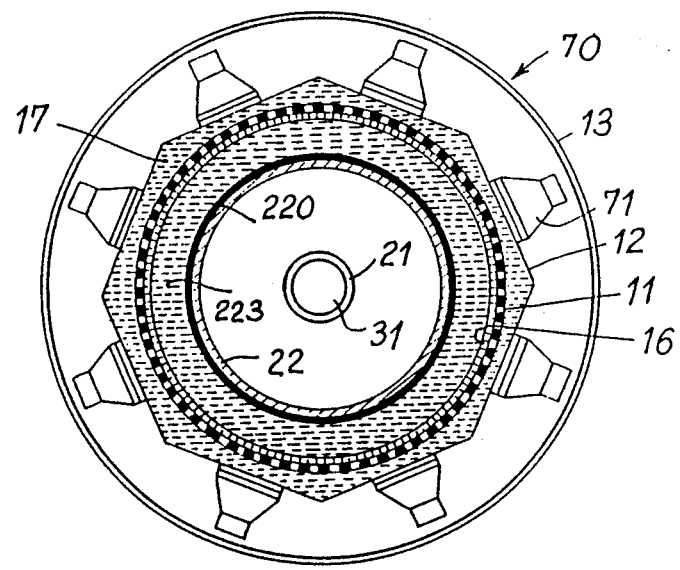
FIGS. 8A, 8B and 8C are various detailed views of the arrangement for cleaning the apparatus according to the invention.
Figure 8B:
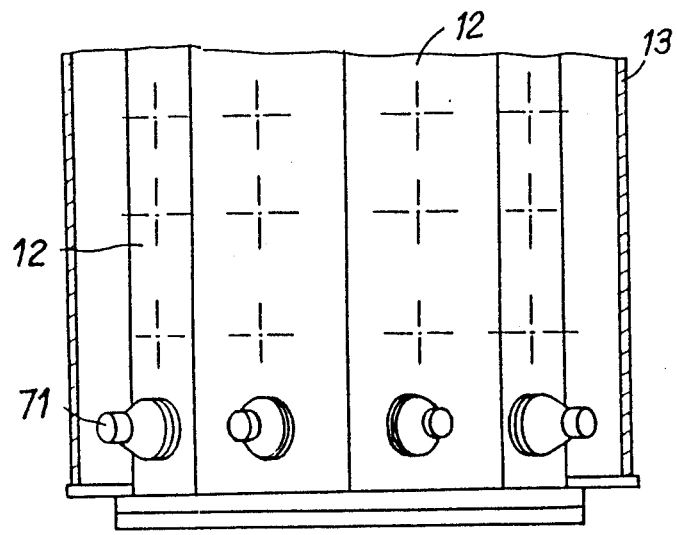

The apparatus according to the invention also comprises a cleaning arrangement 70 shown in particular in FIGS. 8.

Figure 8C:
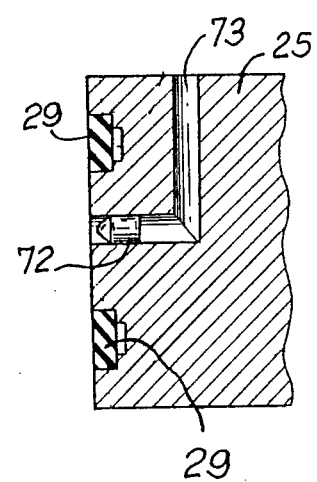

This cleaning arrangement consists, for example, of ultrasonic generators 71 which are fixed on the casing 12, using any suitable method for example gluing. In this case, a polygonal casing is used. The arrangement and tiering of these generators 71 are clearly illustrated in FIGS. 8A and 8B. These generators 71 are protected by the cover 13 which is joined by any suitable method in a sealed manner to one of the reinforcements 15. The cleaning arrangement also comprises, if necessary, nozzles 72, which are provided at the end of connection pipes 73, as illustrated in particular in FIG. 8C, provided with solenoid valves 74. FIG. 8C shows an embodiment where the nozzles 72 are arranged inside the upper counter-flange 25 of the internal group 20 in the case of a split seal 29. These nozzles are located at regular intervals. It is also possible to use other nozzles 720 located underneath the bottom collar 14 of the external group 10, on the periphery of the internal group 20. These nozzles 720 are provided, for example, inside a hollow circle fixed in a suitable manner to the collar for example. This is shown very schematically in particular in FIG. 1.

These nozzles are supplied with fluid by means of solenoid valves 74 governed by control means 90. Pressurized water, to which detergents have been added, is used for example. Reference will be made again below to the cleaning arrangement.

The apparatus according to the invention is also equipped with at least one duct 80 for discharging in particular liquid separated from the substance to be treated. This duct is provided with a solenoid valve 81 governed by the control means 90.

The control means 90 operate in particular the actuating means 60 and the solenoid valves already mentioned, as will be understood below, in order to ensure the correct sequence of the various operating phases of the apparatus according to the invention. These control means 90 are, for example, a programmable microcomputer. It is clear that it is also possible to use relays and cams driven by a suitable servomechanism; this is conventional.

The body 11 is also provided with a filter 16 which is preferably in the form of an interchangeable cartridge.

This filter 16 (FIG. 6), with a configuration of revolution, comprises a screen 160 behind which there is located a meshed network 161 such as a grid serving as a mechanical support in particular. The screen and the network are joined by end rings 162 which are mounted as illustrated in detail in FIG. 6, for example by means of screws 163 with a sunken milled head, engaged inside a reinforcement.

As can be seen by comparing the illustrations of FIGS. 1, 5A, 5B and 6 in particular, a given play is provided between the periphery of the collars and that, located opposite, of the counter-flanges; these peripheries are smooth and no projection exists there except when the dilatable seals expand and thus take up this play. The same applies to the filter and the scraper; the given play allows the scraper to pass into the vicinity of the actual screen. It will be noted also, in FIG. 6, that the rings of the filter are slightly set back or at the most lie flush with the periphery of the corresponding collars. Also, external group and internal group are able to slide freely relative to each other without difficulty since they are directed by the guide.

It will be noted that the fixing systems adopted allow easy disassembly which facilitates cleaning, maintenance or repair operations.

The main features of the structure of the illustrated embodiment of the apparatus according to the invention having been described, the mode of operation will now be described.

Intially the apparatus is in the position shown in FIG. 1. The hopper 40 is full of substances to be treated, the solid matter of which must be separated from the liquid in which they are suspended. The control means 90 are activated. They operate the solenoid valves, in particular that 81 of the discharge duct 80 so as to open it, as well as the solenoid valves 294 of the piping 293 so that the seals 29 of the counter-flanges 25 remain in the rest condition. The seals thus occupy the position illustrated in continuous lines in FIGS. 5A and 5B; a sealing action is therefore not ensured between internal group and external group which are free to move without obstruction.

Figure 4:
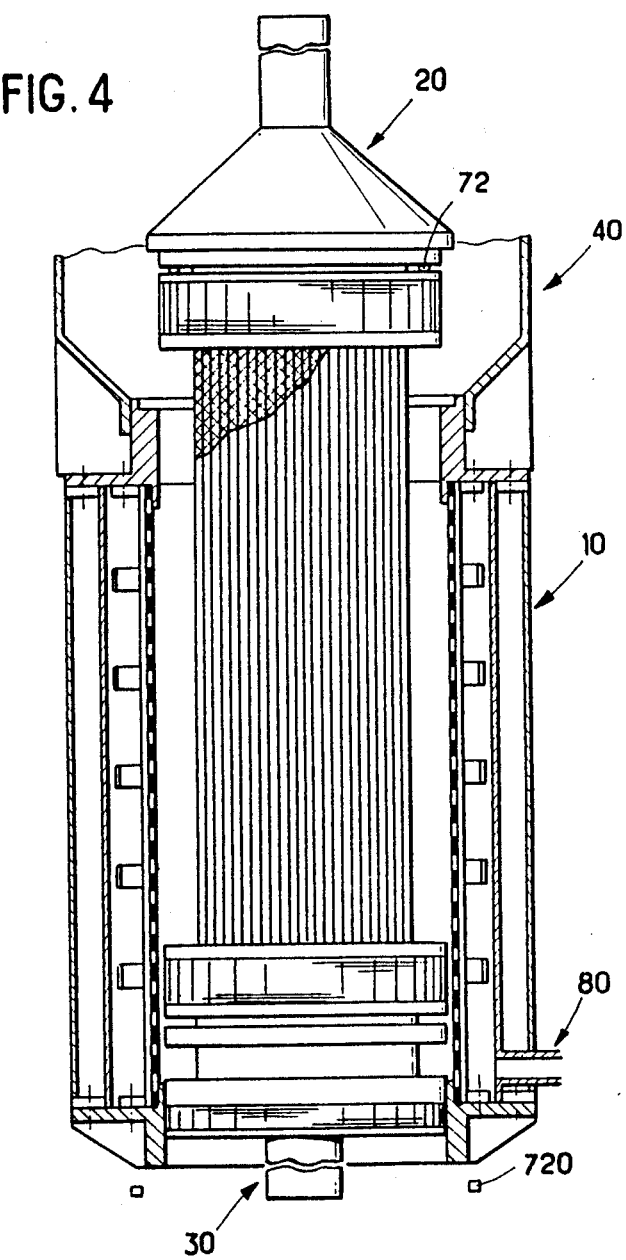
FIG. 4 is a view similar to that of FIG. 3 in another relative position of the external and internal groups of the apparatus according to FIG. 1.

The actuating device 60 is operated and causes the internal group to slide relative to the external group, as illustrated in FIG. 4. The closing device 43 is open, the internal group raising the valve and the substance to be treated thus fills the enclosure 223 by means of gravity. Gradually as it is introduced, liquid is separated spontaneously from the solid matter of the substance to be treated passing through the filter 16 and flowing into the chamber 17. When the enclosure 223 is full, the control means 90 operate again the actuating device 60 so as to reposition the apparatus in the position in which it is illustrated in FIG. 1.

The seals 29 are then inflated, the control means 90 operate the solenoid valves 294 of the piping 293, so as to dilate the said seals as illustrated in broken lines in FIG. 5A and 5B and ensure a sealing action between the counter-flanges 25 and the collars 14, both top and bottom, of the internal and external groups.

The control means 90 then operate the solenoid valve 225 of the conduit 224 so as to blow in pressurized fluid, for example compressed air in order to dilate the elastic membrane 220. The latter swells and forces the liquid of the substance to be treated from the enclosure 223 into the chamber 17, while pressing the solid matter against the filter 16.

Figure 3:
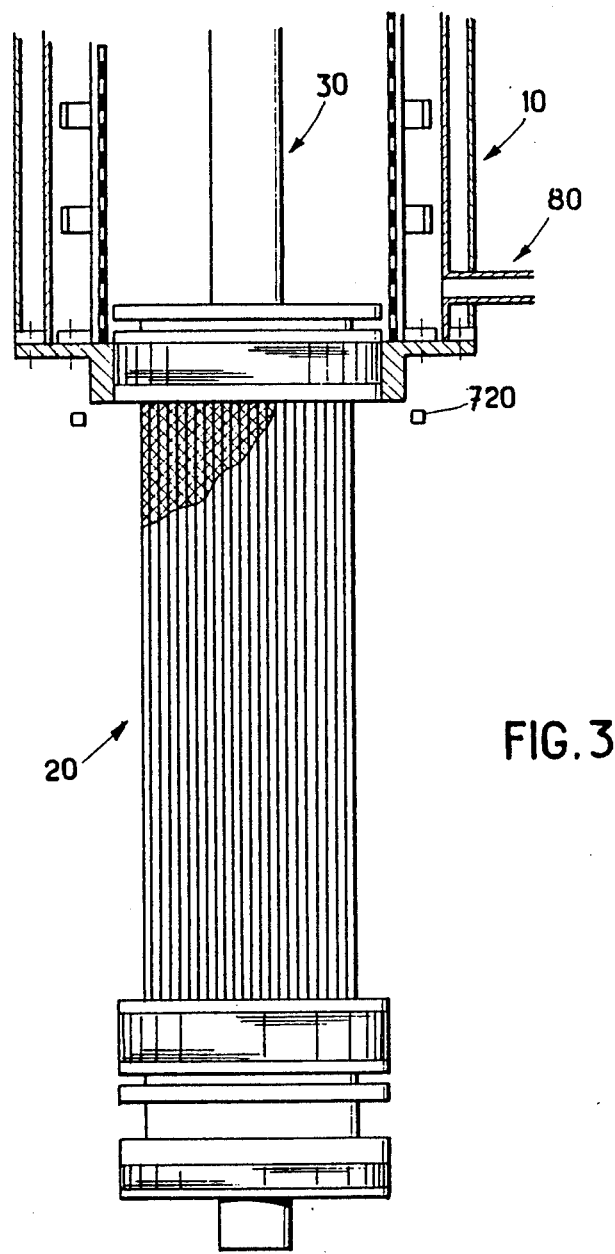
FIG. 3 is a view similar to that of FIG. 1 in which the apparatus is shown in a position where the internal and external groups are disengaged from each other without the actuating device being shown.

When the operation is completed, the elastic membrane 40 is deflated, as well as the seals 29; to achieve this, the control means 90 operate the solenoid valves 225 and 294, respectively. The control means 90 then operate the actuating device 60 so as to place the apparatus in the position in which it is illustrated in FIG. 3, the internal group 20 being practically disengaged outside the external group 10. The closing device 43 remains closed because the valve 430 does not follow the internal group and remains on its seat 432 on which it rests.

When the internal group 20 passes from the position in which it is shown in FIG. 1 to that in which it is shown in FIG. 3, the scraper 50 passes in the vicinity of the internal surface of the filter 16 and detaches from it the compacted solid matter which would have the tendency to adhere thereto. This matter is collected in a suitable tank, not shown, located at the base of the apparatus from where it is removed for example by a conveyor. In this connection it will be noted that the mesh 222 which covers the membrane 220 prevents the drainage channels 221 from becoming blocked and also ensures, where applicable, cleaning thereof should the need arise.

At the end of this operation, the internal group 10 is rearranged in the position in which it is shown in FIG. 1 by means of the actuating device 60 operated by the control means 90.

During this descending and/or ascending translatory movement, the nozzles 72 and/or 720 of the cleaning arrangement 70 have been able to operate so as to clean, respectively, the filter 16, if the latter tended to become clogged, and the membrane 220, if solid matter still adhered to the channels and/or to the mesh. The nozzles are supplied with suitable cleaning fluid, for example pressurized water to which are added agents suitably adapted to the nature of the residue to be removed. This fluid is supplied via connection pipes 73, the solenoid valves 74 of which are activated at the appropriate moments and for the given durations by the control means 90 so that the operations are performed in a sequence which ensures correct and efficient operation of the apparatus according to the invention. The cleaning fluid collected is recovered or removed as is conventional and for this reason not shown; if there is no incompatibility, it is possible to make use of the duct 80, if not a particular special circuit, not shown, is used.

In the case where this cleaning action by the jets of the nozzles is not sufficient, or if necessary independently thereof, the procedure described now is adopted.

The solenoid valve 81 of the duct 80 for removing the separated fluid is closed and the seals 29 dilated; then, both the chamber 17 and the enclosure 223 are filled with a suitable fluid and if necessary, where applicable, the seals which are located on the periphery of the dividers 170 are inflated so as to isolate the various compartments 173 defined by the said dividers from each other. The control means 90 operate, sequentially if required, the various solenoid valves 76 of the pipes 75 for the cleaning fluid and, if necessary, the solenoid valves inflating the seals of the dividers, so as to modulate the pressure and/or the flow rate in the various compartments. It is thus possible to clean the filter in accordance with a predetermined pattern. To achieve this, a programmable microcomputer is used, for example, as the control means 90. The method of compiling the series of instructions for activating such a computer is well known and does not form part of the invention.

It can be seen therefore that it is possible, by operating the solenoid valves, to obtain a pressure and/or flow-rate sequence for given periods and in a chronological order which can be chosen according to the particular needs to be met, linked, in particular, with the filter (type, pore size) and the residual products.

Depending on the nature of the fluid used for cleaning, the latter is able to flow, as already indicated, directly into the duct 80 for discharging the treated liquid or, if a particular liquid is used, it is possible to recycle it after clarification 77, reconstitution 78 and pumping 78, in accordance with the diagram which is shown in FIG. 1.

The hopper 40 has been filled again or its level replenished with substances to be treated and the operations are repeated as has been described.

In order to simplify the description of the mode of operation, the various stages and operations have been described in succession. It is obvious that, for the sake of efficiency, some of these may be at least partially simultaneous.

FIGS. 5A and 5B show the detail of embodiments of inflatable seals 29. These seals may be either single, as illustrated in FIG. 5A, or double, as illustrated in FIG. 5B, or even split as illustrated in FIG. 8C. The annulus 290 is, for example, made of an elastomeric rubber with a Shore hardness of about 50 or 60. If necessary, this rubber is bonded onto the surfaces of the recesses of the sleeve 27, counter-flanges 25 and dividers 170. These rubber annuli have, for example, a thickness of about 6 mm and a length of about 80 mm. They are arranged such that their external surface lies in the extension of the external surface of the counter-flanges and sleeve, as illustrated. Correct operation is obtained by providing maximum play of the order of 5 to 6 mm between the external surface of the counter-flanges and sleeve on the one hand and the internal surface of the filter or the collars on the other hand.

The existence of this play does not impair in any way the quality of the relative translatory movement of the internal and external groups, since their displacement is directed by the guide 30, the internal wall 32 of the tube 21 sliding practically without play on the column 31.

Figure 6:
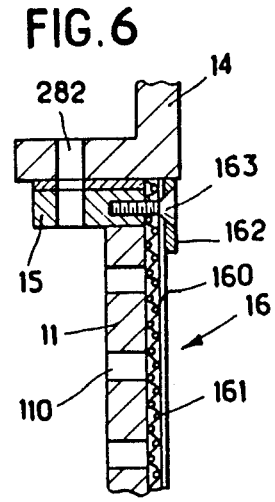
FIG. 6 is a partial detailed section through an embodiment of a filter for the apparatus according to the invention which is in the form of an interchangeable cartridge.

By examining FIG. 6, it is possible to see the manner in which the filter 16 is constructed. Underneath the actual screen 160 there is located a meshed network 161, similar to a grid, which improves its mechanical characteristics and also ensures drainage of the liquid which is separated from the substance to be treated.

The filter 16 is held by means of screws 163 engaged in the reinforcements 15, as illustrated. As can be seen, the heads of the screws are sunk inside the rings so as not to project. It can be understood, therefore, that the scraper is able to slide without being impeded in any way.

The method of assembly adopted being that illustrated, it can be seen that it is very easy to change the filter, which is in the form of an interchangeable unit, and replace it with another one whenever the need arises —for example, when the filter is spent or when it is required to change it for another filter with different characteristics so that it is perfectly suited for the nature of the substance to be treated.

Figure 7:
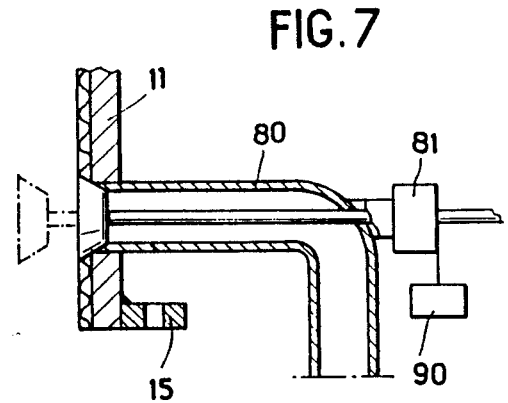
FIG. 7 is a detailed view of an embodiment of a solenoid valve of the discharge duct of the chamber of the apparatus according to the invention.

FIG. 7 shows a particular embodiment of the solenoid valve 81 which enables the washing fluids and/or separated liquid to be recovered via the discharge duct 80.

FIG. 8C shows an embodiment of the nozzles 72 accommodated in the upper counter-flange 25; these nozzles enable the filter 16 to be sprayed by pressurized jets when the solid matter is recovered.

Since most of the pipes, piping and tubing, pipe connections, conduits and other ducts are connected between fixed and movable parts, suitable flexible connections are installed where necessary, as is conventional.

With reference to FIG. 9, the mode of assembly of an actuating device 60 is shown. In this embodiment, two pneumatic or hydraulic jacks are used, arranged on either side of the apparatus. As can be seen, one of the groups is fixed integrally to the plunger of the jack, while the other group is, itself, integral with the cylinder; it is, of course, possible to adopt the reverse solution. Fixing of the jack and groups is achieved, as is conventional, by means of gussets, lugs or the like, which are screwed or welded, for example, at the appropriate locations. In this embodiment, only the internal group is movable between the positions shown in continuous and broken lines. This jack and the guide are suitably anchored to a structure, not shown.

FIG. 10 shows another embodiment of an actuating device 60. In this case, the latter comprises at least one jack which operates the external group with which the hopper is associated, and one jack, or the like, which directly or indirectly operates via a flexible transmission 63 and guide pulleys 64, for example as shown, the internal group such that these two groups are both movable, separately and relative to each other and independently of each other. By lowering the internal group from the position in which it is shown, so as to engage totally inside the external group, the enclosure is filled with substance to be treated. This arrangement is suitable when this substance to be treated is relatively firm, thick and/or viscous; in fact, this substance does not tend to flow spontaneously owing to the effect of gravity, and lowering of the internal group favours entrainment thereof. Once displacement has been effected, the internal group is kept in the lowered position and the external group is raised, thereby enabling the solid matter to be collected. Coordination of operation is ensured by the control means.

An apparatus according to the invention may be used on its own or together with several others in a group or batch operating simultaneously or in succession so as to achieve practically continuous operation and a high level of reliability; in fact, if one of the apparatus were to fail, it would be possible to continue operating with the other apparatus which were still operational.

Such grouping also facilitates maintenance since, with a minimum of suitably chosen spare parts, it is possible to carry out repairs or preventive maintenance without having to interrupt completely operation of all the apparatus in an installation.

As a result of the apparatus according to the invention, compacted solid matter with a dry-matter content of at least 45 to 50% is obtained.

Thus, to obtain directly a dry-matter content for the recovered solid matter, which is at least equal to 43%, without having to add additives or filler minerals to improve separation of the solid matter from the liquid, is an advantage. In particular, it is not necessary to add lime or iron chromides. This advantage is particulary significant when the effluent of an urban sewage purification plant is being treated. As a result of this, the solid matter recovered in a collection tank is directly conveyed into a crusher and, from there, directed to a screw-type extruder. This extruder enables granulates of the order of 5 to 6 mm in diameter and of practically equal length to be obtained, since the solid matter obtained with this dry-matter content at least equal to 43% has a good consistency and hence cohesion enabling granulates to be obtained directly at the outlet of the extruder; the adjacent cakes which emerge from the dies of the extruder are sufficiently dry such that they do not to sag and stick to each other and re-agglomerate, but on the contrary break spontaneously as soon as their length approaches their diameter. The granulates thus obtained may be stored for example in a sheltered or open-air location so as to complete the drying process and obtain a dry-matter content of 95%. It is also possible to accelerate the process by storing the said solid material in, if necessary heated, forced-ventilation silos.

Consequently, it is possible to upgrade the solid matter thus recovered, for example for use as a fuel in thermal incineration plants or so that they can be spread directly over fields in the form of fertilizer using the modern-day conventional equipment which is available to farmers, without the need for any special adaptation. It is also possible to subject the granulates thus obtained to gasification by pyrolysis so as to recover clean combustible gases.

The above description refers to an apparatus according to the invention which has symmetry of revolution and which, preferably, has a cylindrical design. It is obvious that this apparatus may be given a very small conicity, with an angle of the order of 1° or 2° so as to facilitate separation of the movable group relative to the fixed group and thus allow the solid matter pressed against the filter to be removed more easily.

I claim:

1. Apparatus comprising: means for separating into its two phases a substance consisting of solid matter suspended in a liquid and for recovering them separately in the compacted state with a high dry-matter content and in the liquid state practically free from solid matter, including, an external unit and an internal unit, said external unit comprising a body permeable with respect to the liquid and impermeable with respect to the solid matter, said external and internal units having a common axis and symmetry of revolution and being axially movable relative to each other in a direction parallel to their common axis, and said external and internal units defining enclosure means for receiving the substance to be treated and also defining chamber means for receiving the liquid separated from the substance in said enclosure means, said chamber means and said enclosure means being separated by said body, expandable impervious elastic membrane means for reducing the volume of said enclosure means for expelling from said enclosure means the liquid of the substance from said enclosure means into said chamber means and for pressing the solid matter against said body;

scraper means for detaching the solid matter pressed against said body so that the solid matter can be collected separately;

vertical central guide means for directing the relative displacements of said external unit and said internal unit along their common axis; and hopper means for supplying said enclosure means with the substance to be treated, said hopper means being mounted on top of and fixed to said external unit, said hopper means including closing means for closing said hopper means at the bottom end thereof, said closing means being centered on said guide means.

2. Apparatus according to claim 1, wherein said central guide means comprises a relatively slidable column and tube engaged one within the other.

3. Apparatus according to claim 2, wherein said tube has upper and lower ends, and wherein said internal unit comprises said tube, upper and lower circular rims fixed respectively at said upper and lower ends of said tube, upper and lower flanges mounted respectively on said upper and lower rims, and upper and lower peripheral counter-flange means partially surrounding said upper and lower flanges, respectively, for clamping said membrane means and holding said membrane means in position.

4. Apparatus according to claim 3, wherein each of said flanges and each of said counter-flange means includes a conical flank, said conical flanks of corresponding flanges and counter-flange means being complementary and facing each other and adjustable to clamp and tension said membrane means.

5. Apparatus according to claim 3, wherein said scraper means comprises a peripheral edge of at least one of said counter-flange means, said peripheral edge having an undercut angle.

6. Apparatus according to claim 3, wherein said internal unit further comprises a skirting mounted between said upper and lower circular rims coaxial with said tube, against which said membrane means can rest, said skirting together with said body defining said chamber means.

7. Apparatus according to claim 3, wherein said body has upper and lower ends, and wherein said external unit comprises said body, upper and lower collars fixed respectively to said upper and lower ends of said body, and a casing mounted between said upper and lower collars and outside said body, said casing together with said body defining said chamber means.

8. Apparatus according to claim 7, wherein said closing means comprises an annular valve movable on said column and a valve seat, and wherein said valve seat is mounted on said upper collar, and said valve is bell-shaped having a shoulder, said shoulder cooperating with said valve seat.

9. Apparatus according to claim 7, further comprising cleaning means for cleaning said filter and said membrane means, and wherein said cleaning means comprises a plurality of ultrasonic generators fixed on said casing.

10. Apparatus according to claim 3, wherein said closing means comprises and annular valve movable on said column and a valve seat.

11. Apparatus according to claim 1, wherein said hopper means comprises an upper tank portion and a bottom funnel portion, said closing means being located in the middle of said hopper means.

12. Apparatus according to claim 1, wherein said chamber means includes a plurality of annular divider means for dividing said chamber means into tiered compartments.

13. Apparatus according to claim 12, wherein said divider means comprise a plurality of partitions joined by a plurality of struts.

14. Apparatus according to claim 12, wherein at least some of some divider means having seal means for isolating at least some of said compartments from each other.

15. Apparatus according to claim 14, wherein said seal means are dilatable.

16. Apparatus according to claim 1, further comprising seal means located between said external and internal units for providing at least temporary sealing action between said external and internal units.

17. Apparatus according to claim 16, wherein said seal means are expandable.

18. Apparatus according to claim 17, wherein each of said seal means comprises an annulus positioned in a hollowed cavity of a groove in one of said counter-flange means.

19. Apparatus according to claim 18, wherein said annulus has a dovetail protrusion engaged inside a complementary recess in said counter-flange means.

20. Apparatus according to claim 1, further comprising actuating means for causing the relative axial movement between said internal unit and said external unit.

21. Apparatus according to claim 20, wherein said actuating means comprises at least one jack having a plunger and a cylinder, said plunger being associated with said internal unit and said cylinder being associated with said external unit.

22. Apparatus according to claim 21, wherein one of said internal and external units is fixed and the other of said internal and external units is movable.

23. Apparatus according to claim 21, wherein said internal and external units are both movable.

24. Apparatus according to claim 1, further comprising a filter located inside said enclosure means against said body.

25. Apparatus according to claim 24, wherein said filter comprises an interchangeable cartridge having first and second ends and comprising a meshed network, a screen pressed against said meshed network, and first and second rings respectively terminating said first and second ends.

26. Apparatus according to claim 24, further comprising cleaning means for cleaning said filter and said membrane means.

27. Apparatus according to claim 26, wherein said cleaning means comprises nozzles for directing jets of fluid in the direction of at least one of said body and said membrane means.

28. Apparatus according to claim 1, further comprising control means for sequencing the operating phases of said apparatus.

29. Apparatus according to claim 28, further comprising solenoid valve means for inflating and deflating said membrane means, and wherein said control means operate said actuating device and said solenoid valve means.

* * * * *